United States Patent [19]

Huggler

[11] Patent Number: 5,664,481
[45] Date of Patent: Sep. 9, 1997

[54] TOASTER WITH BAKERY PRODUCT SHIELD

[75] Inventor: Peter Huggler, Columbia, Mo.

[73] Assignee: Toastmaster Inc., Columbia, Mo.

[21] Appl. No.: 752,053

[22] Filed: Nov. 19, 1996

[51] Int. Cl.⁶ .............................. A47J 37/08; H05B 1/02; H05B 3/06
[52] U.S. Cl. .................. 99/328; 99/326; 99/329 P; 99/329 RT; 99/389; 99/391; 99/401; 99/447; 219/481; 219/489; 219/492; 219/521
[58] Field of Search .................... 99/372, 385, 389–392, 99/388, 325–335, 400, 401, 447; 219/413, 414, 396, 398, 481, 489, 492, 518–521, 512; 392/375, 337, 407

[56] References Cited

U.S. PATENT DOCUMENTS

| 2,251,925 | 8/1941 | Edmunds et al. |
| 2,330,644 | 9/1943 | Uhlrig . |
| 2,621,583 | 12/1952 | Victor . |
| 2,621,584 | 12/1952 | Palmer . |
| 2,631,523 | 3/1953 | Olving . |

(List continued on next page.)

FOREIGN PATENT DOCUMENTS

| 548814 | 10/1942 | European Pat. Off. . |
| 568498 | 4/1945 | European Pat. Off. . |
| 600875 | 5/1948 | European Pat. Off. . |
| 6490005 | 1/1951 | European Pat. Off. . |
| 1400429 | 7/1975 | European Pat. Off. . |
| 1573012 | 8/1980 | European Pat. Off. . |

(List continued on next page.)

Primary Examiner—Timothy F. Simone
Attorney, Agent, or Firm—Kokjer, Kircher, Bowman & Johnson

[57] ABSTRACT

A toaster having a movable bakery product shield for enhanced toasting quality. A wide slot cavity to receive bakery goods for toasting is defined on one side thereof by an upstanding, stationary product retainer spaced apart from a heating element and, on the other side thereof, by a movable product retainer having a deflector shield connected along its upper edge. Interiorly of the toaster, a carriage mechanism is mounted on an end wall for vertical reciprocal movement between an up position and a down position. Connected to the carriage mechanism and extending longitudinally through the slot cavity is a bread support shelf which is inclined toward the stationary product retainer to cause the lower edge of a bread slice placed in the toaster slot to engage the stationary product retainer. Depressing the carriage mechanism to the down position simultaneously causes the movable product retainer to bias the upper edge of the bread slice to the stationary product retainer and operates a switch to energize the heating element to effect toasting. For bakery goods having a thickness less than the full width of the toaster slot, the deflector shield along the upper edge of the movable product retainer reduces the opening of the toaster slot to enhance toasting quality.

6 Claims, 3 Drawing Sheets

U.S. PATENT DOCUMENTS

| | | | |
|---|---|---|---|
| 2,631,524 | 3/1953 | Theisen . | |
| 2,638,164 | 5/1953 | Victor . | |
| 2,734,448 | 2/1956 | McCullough . | |
| 2,739,523 | 3/1956 | McCullough . | |
| 2,878,748 | 3/1959 | Stanek . | |
| 2,879,707 | 3/1959 | Ambrose . | |
| 2,913,976 | 11/1959 | Cole . | |
| 3,086,623 | 4/1963 | Cole . | |
| 3,129,649 | 4/1964 | Visos . | |
| 3,129,651 | 4/1964 | Visos . | |
| 3,129,652 | 4/1964 | Kueser . | |
| 3,229,614 | 1/1966 | Matzenauer | 99/327 |
| 3,291,968 | 12/1966 | Snyder . | |
| 3,392,663 | 7/1968 | Williams . | |
| 3,438,318 | 4/1969 | Williams . | |
| 3,587,025 | 6/1971 | Dokos et al. | 219/521 |
| 3,828,559 | 8/1974 | Siemensma | 99/328 |
| 3,869,970 | 3/1975 | Eagle . | |
| 4,092,520 | 5/1978 | Holmes et al. . | |
| 4,110,600 | 8/1978 | Spotts et al. | 219/486 X |
| 4,154,151 | 5/1979 | Mochizuki . | |
| 4,188,865 | 2/1980 | Bjarsch . | |
| 4,201,124 | 5/1980 | Huggler | 99/327 |
| 4,216,372 | 8/1980 | Huggler | 219/521 |
| 4,217,482 | 8/1980 | Wadia . | |
| 4,296,312 | 10/1981 | Salem | 219/501 |
| 4,345,513 | 8/1982 | Holt . | |
| 4,382,175 | 5/1983 | Huggler | 99/329 R |
| 4,395,621 | 7/1983 | Parker . | |
| 4,518,849 | 5/1985 | Rolland | 219/492 |
| 4,687,906 | 8/1987 | Fujishima et al. . | |
| 4,755,656 | 7/1988 | Charlesworth et al. . | |
| 4,906,818 | 3/1990 | Lumpp et al. | 392/375 |
| 5,018,437 | 5/1991 | San Juan . | |
| 5,044,263 | 9/1991 | Birkert et al. . | |
| 5,094,154 | 3/1992 | Nopanen . | |
| 5,126,536 | 6/1992 | Devlin . | |
| 5,156,637 | 10/1992 | Wai-Ching | 99/388 |
| 5,193,439 | 3/1993 | Finesman et al. | 99/327 |
| 5,283,421 | 2/1994 | Richards . | |
| 5,304,782 | 4/1994 | McNair et al. . | |
| 5,385,082 | 1/1995 | Huggler et al. | 99/328 |

FOREIGN PATENT DOCUMENTS

| | | |
|---|---|---|
| 2624563 | 9/1977 | Germany . |
| 18421 | 10/1978 | Taiwan . |
| 23783 | 10/1978 | Taiwan . |
| 33776 | 11/1980 | Taiwan . |
| 37652 | 6/1981 | Taiwan . |
| 112345 | 4/1989 | Taiwan . |
| 113574 | 5/1989 | Taiwan . |
| 153026 | 3/1991 | Taiwan . |

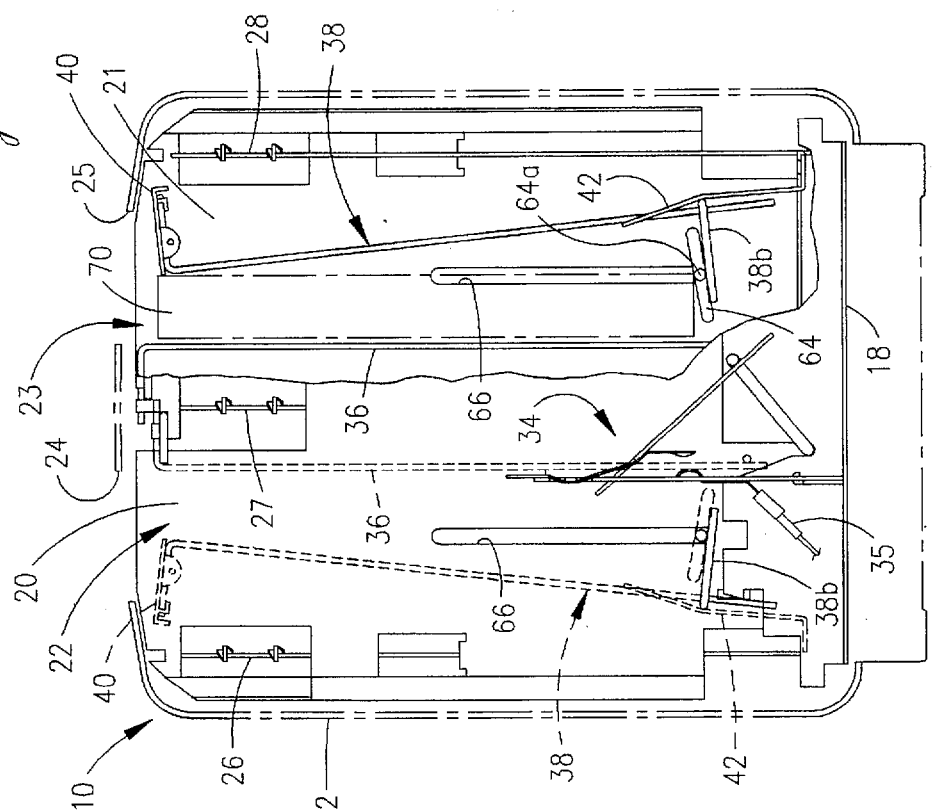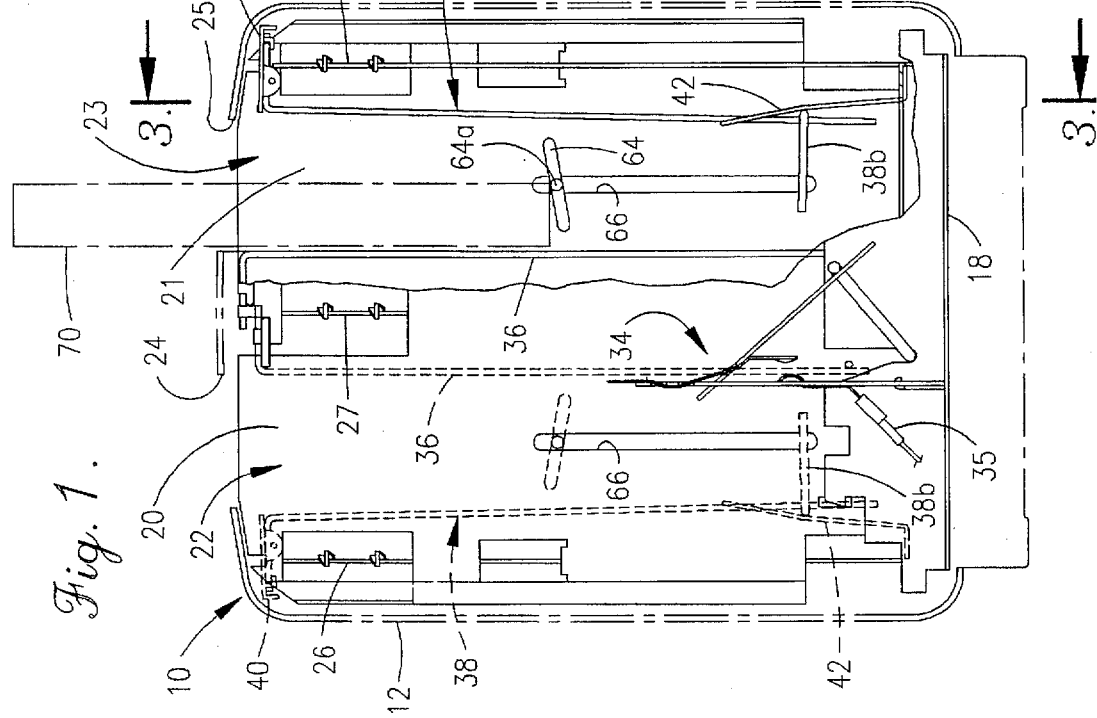

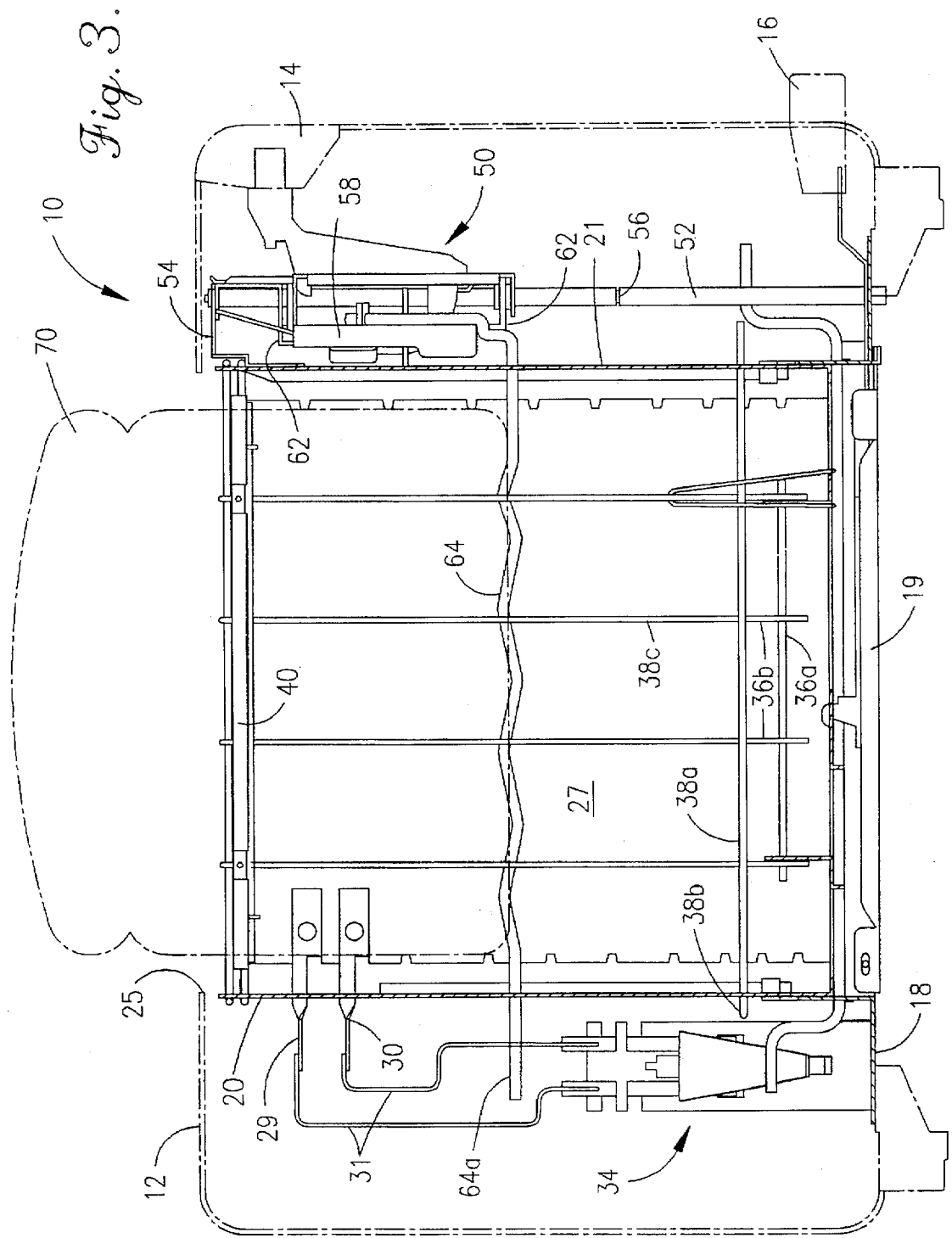

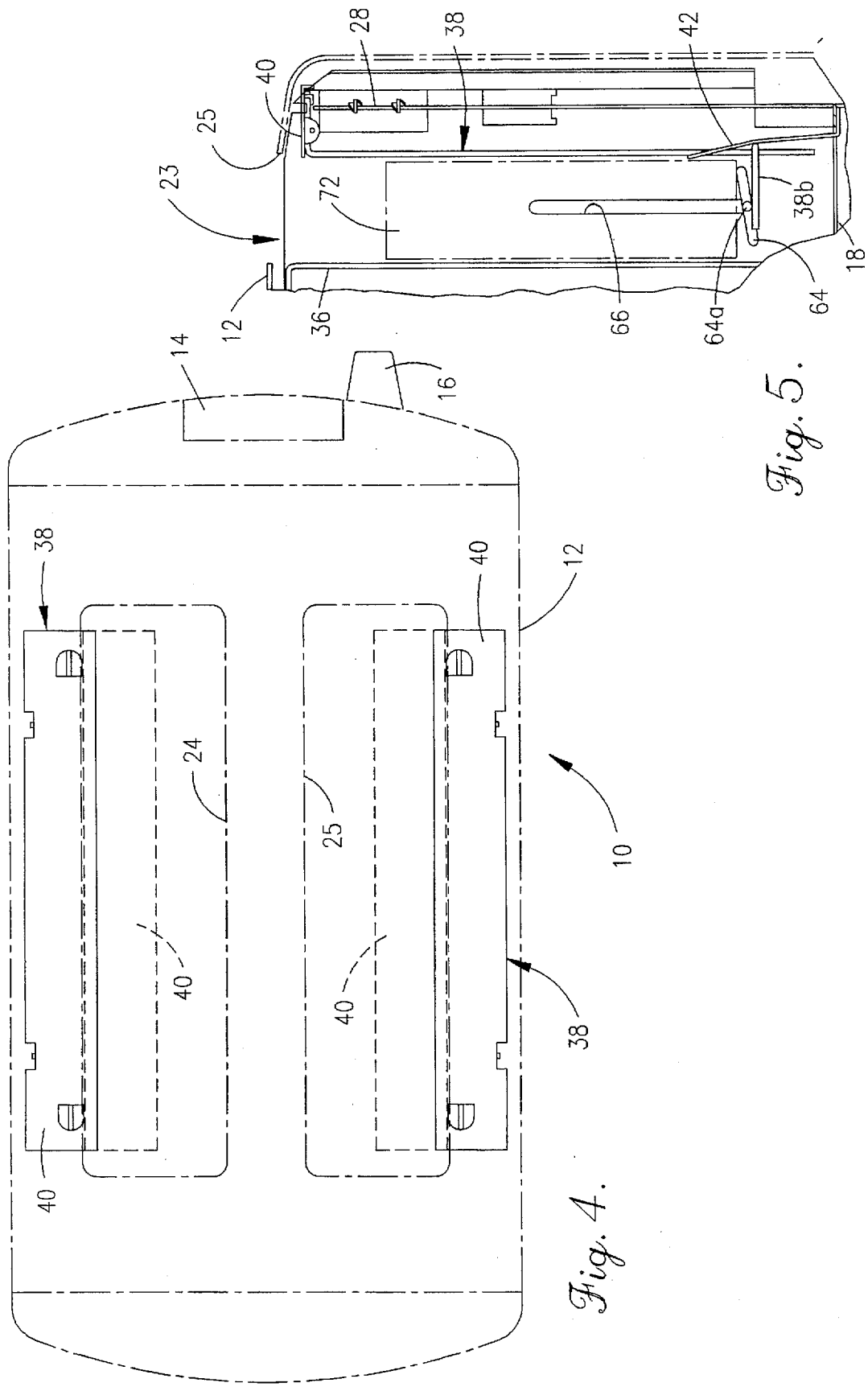

TOASTER WITH BAKERY PRODUCT SHIELD

FIELD OF THE INVENTION

The present invention relates in general to food preparation appliances. In particular, the present invention relates to an improved toaster having a bakery product shield for enhanced toasting quality and improved safety.

BACKGROUND OF THE INVENTION

Electric, pop-up toasters have been commonly employed for numerous years and were originally designed to toast sliced bread. The bread product was generally of a uniform thickness and prior toasters included a housing which defined one or more slots appropriately sized with a Width of approximately ¾" (20 mm.) to receive the bread slices. Such appliances functioned acceptably to produce toast which was even and uniform in appearance.

In such prior toasters, within the bread receiving slot is located a support shelf on which the lower edge of the bread slice rests, and a plurality of electrical heating elements which cause the toasting of the bread. The product support shelf is connected to a vertically moveable carriage within the toaster housing. In use, the carriage is moved downward to position the bread slice between the spaced apart heating elements. Although the carriage is spring biased upwardly, when fully depressed to the down position, the carriage is releasably locked and the heating elements are electrically energized through a switch. After a predetermined time and/or temperature is reached, the carriage is automatically released from its lowest, down position, with the spring bias causing the carriage to "pop" upwardly. Such movement opens the switch to de-energize the heating elements and positions the bread slice partially out of the slot where it may be manually retrieved by the user.

As previously mentioned, when bread slices were generally uniform in thickness, these earlier toasters could be appropriately sized to produce uniform, evenly toasted bread. In other words, the spacial relationship between the bread slice and the heating elements could be controlled to produce uniformity.

Through the years, consumer preferences for toasted comestibles have changed and the baking industry has responded with a wide variety of goods such as muffins, bagels, waffles, french toast, and the like. The size and thickness of these bakery goods vary considerably from the traditional notion of a more or less uniform bread slice. Accordingly, in order to accommodate a wider variety of bakery products, appliance manufacturers gradually increased the size of toaster slots from ¾" (m) to 1" (m), then to 1.2" (m), and finally to 1.4" (m).

Such changes to permit the toasting of thicker baked goods, however, were not without problems. The wider slot openings also changed the air circulation characteristics around the bakery product during the toasting process. One side effect, many felt, was a dryer product which was less flavorous. Inconsistency and unevenness in toasting also seemed to be undesirable results from the increased widths of toaster slots.

Attempting to address the problem of dryness, one appliance manufacturer produced a toaster having a movable slot cover. In the commercial embodiment, the toaster had two parallel bread slots. A carrier was mounted internally of the housing on horizontal slide rods at one end of the toaster for reciprocal horizontal movement thereon. The slot cover was connected to the slidable carrier through an opening in the upper surface of the housing which extended parallel to the end wall of the toaster. Thus, the slot cover, consisting of two spaced apart, parallel strips of metal, was connected in cantilever fashion to the slidable carrier to overlie the top exterior surface of the toaster housing. When the toaster was loaded and depressed to the down position, the slot cover slid over the slot openings to cover them during the toasting process. According to the manufacturer's theory, covering the slot openings retained any moisture present in the bread slices within the confines of the toaster housing and helped prevent the toast from drying out. Such solution, however, did not address the problems of inconsistent and nonuniformity of toasting bakery goods having a thickness less than the full thickness of the toaster slots.

In spite of whatever beneficial effect on dryness was achieved by the prior art toaster having a slidable slot cover, a more serious problem accompanied such solution. When the toaster was depressed to the down position, the heating elements were energized. The heat tended to rise to escape through the openings normally presented by the toaster slots themselves. Since these openings were essentially closed by the slot cover, the heat generated by the elements within the toaster caused the slot cover itself to become quite hot. Accordingly, the user was confronted with a safety hazard of a hot slot cover when retrieving toast or when moving the toaster before the slot cover had sufficient time to return to ambient conditions.

The need remains for a safe, economical and efficient toaster appliance capable of producing toasted comestibles of uniform and consistent quality. The primary goal of this invention is to meet these needs, and to overcome the drawbacks previously experienced.

SUMMARY OF THE INVENTION

More particularly, an object of the invention is to provide a wide slot toaster adapted to uniformly and consistently toast bakery goods having a thickness less than the full width of the toaster slot while full flavor of the comestible is retained.

Another object of the invention is to provide a toaster adapted to position and hold thin sliced bakery goods in a spaced apart relationship with heating elements to create a uniformly consistent toasting pattern.

Another object of the invention is to provide a toaster of the character as previously described having a product shield to effectively reduce the opening of the toaster slot when toasting bakery goods having a thickness less than the full width of the toaster slot and to thereby retain the full flavor of the comestible.

A further object of the invention is to provide a toaster of the character as previously described to achieve improved toasting quality in a safe and efficient manner. Unnecessary heating of exposed exterior surfaces is minimized by providing a movable bakery shield which is interiorly recessed when not in use to prevent contact by the user.

These and other objects are achieved by a toaster having a wide slot cavity to receive bakery goods for toasting which is defined on one side thereof by an upstanding, stationary product retainer spaced apart from a heating element and, on the other side thereof, by a movable product retainer having a deflector shield connected along its upper edge. Interiorally of the toaster, a carriage mechanism is mounted on an end wall for vertical reciprocal movement between an up position and a down position. Connected to the carriage mechanism and extending longitudinally through the slot cavity is a bread support shelf which is inclined toward the stationary product retainer to cause the lower edge of a bread slice placed in the toaster slot to engage the stationary product retainer. Depressing the carriage mechanism to the down position simultaneously causes the movable product retainer to bias the upper edge of the bread slice to the stationary product retainer and operates a switch to energize the heating element to effect toasting. For bakery goods having a thickness less than the full width of the toaster slot, the deflector shield along the upper edge of the movable product retainer reduces the opening of the toaster slot to enhance toasting quality.

Other and further objects of the invention, together with the features of novelty appurtenant thereto, will appear in the course of the following description.

BRIEF DESCRIPTION OF THE DRAWINGS

In the accompanying drawings which form a part of the specification and are to be read in conjunction therewith and in which like reference numerals are used to indicate like parts in the various views:

FIG. 1 is an end elevational view of a toaster constructed in accordance with a preferred embodiment of the invention, shown in the up position with a bread slice shown in phantom line and with the toaster housing also shown in phantom line;

FIG. 2 is an end elevational view, like that of FIG. 1, but illustrating the toaster in the down position with a bread slice shown in phantom line;

FIG. 3 is a side elevational view taken along line 3—3 of FIG. 1 in the direction of the arrows;

FIG. 4 is a top plan view of the toaster with the toaster housing shown in broken lines and the bakery product shield shown in full lines for the up position and in broken line for the down position; and FIG. 5 is a fragmentary, end elevational view similar to FIG. 2, but illustrating the toaster in the down position with a thick bread slice shown in broken line.

DETAILED DESCRIPTION OF THE INVENTION

Referring to the drawings in greater detail, a toaster constructed in accordance with a preferred embodiment of the invention is generally designated by reference numeral 10. The toaster 10 includes an exterior housing 12 (shown in phantom line) which will substantially surround the operative components of the present invention. The form of the housing 12 may be of virtually any aesthetically pleasing design or decorative ornamentation. Projecting through the housing 12 in conventional manner are appropriate manual controls, such as a depressible lever grip 14 and darkness control knob 16 as shown in FIG. 3.

The lower portion of the toaster is formed by a bottom base frame 18 which is substantially planar and horizontal in use. The base frame 18 may include a selectively openable crumb tray 19 to aid in cleaning the interior of the toaster. Simply for the sake of convention, the toaster 10 may be referenced to a longitudinal direction within the page in FIG. 3 and extending to the left and right horizontally, and a lateral direction which is horizontal and into the page in FIG. 3 or to the left and right in FIGS. 1 & 2. The height dimension would of course be within the page and vertically up and down in FIGS. 1, 2 & 3.

The toaster 10 includes first and second end walls 20 & 21 secured to the base frame 18. Each of the end walls 20 & 21 is substantially planar, lies within a lateral vertical plane and is longitudinally spaced one from the other along the base frame 18. The end walls 20 & 21 thus define the ends of cavities 22 & 23 disposed beneath toaster slots 24 & 25 through the toaster housing 12 (FIG. 4) to receive bakery goods to be toasted.

Laterally spaced apart and extending longitudinally between the end walls 20 & 21 are upstanding, heat reflective baffle walls 26, 27 & 28 which are preferably fabricated of electrically nonconductive, insulative material to form the toaster heating elements. Conventionally arranged in a grid, pattern or coil on one or both sides of the baffle walls 26, 27 & 28 (but not shown for the purpose of clarity in the drawings) is electrical resistance heating wire or ribbon connected to electrical contacts 29 & 30 mounted on the baffle walls. The electrical contacts 29 & 30 of each baffle wall 26, 27 & 28 are connected by leads 31 to an electrical switch mechanism 34 mounted on the base frame 18. The details of construction of the switch mechanism 34 are generally known to those skilled in this art for the purpose of selectively energizing the toaster heating elements by supplying an electric current through a conventional appliance cord 35.

An example of an electrical system and switch mechanism to selectively energize the heating elements of a toaster are found in U.S. Pat. No. 5,385,082, issued Jan. 31, 1995, which is incorporated herein by reference.

Within each cavity 22 & 23 is a stationary, vertical retainer 36 spaced laterally outward a uniform distance from the baffle wall heating element 27. The retainer 36 includes a lower horizontal rod 36a (FIG.1 ) connected to the base frame 18. Extending upwardly from the rod 36a are a plurality of vertical wires 36b bent at a right angle at the upper end thereof and secured to longitudinal cross support 36c interconnecting the end walls 20 & 21. Thus, each retainer 36 within cavities 22 & 23 forms an open fence or bread guard in a vertical plane parallel with, and spaced outwardly from, the adjacent baffle wall heating element 27.

Within each cavity 22 & 23 and opposite the stationary retainer 36 just described is a pivotally movable retainer 38 spaced laterally outward a uniform distance from the baffle wall heating element 26 or 28. The movable retainer 38 includes a lower horizontal rod 38a which is pivotally received by holes in the end walls 20 & 21. As best seen in FIG. 1, one end of the horizontal rod 38a extends through the end wall 20 and is bent at a right angle to form a lever arm 38b. Between the end walls 20 & 21 and extending upwardly from the rod 38a along its length are a plurality of vertical wires 38c bent at a right angle at the upper end thereof slightly above the upper edge of the adjacent baffle wall 26 or 28 to be connected to a horizontal cross rod 38d. A deflector shield 40 is connected to the upper end of the movable retainer 38 to substantially overlie the right angle bent portions of the vertical wires 38c and their connecting cross rod 38d.

Secured to the base frame 18 and engaging the movable retainer 38 is a spring member 42 adapted to urge the upper end of the movable retainer 38 away from the stationary retainer 36 and toward the baffle wall heating element 26 or 28. In such position, as shown in FIG. 1, each retainer 38 within cavities 22 & 23 forms an open fence or bread guard in a vertical plane substantially parallel with, and spaced outwardly from, the adjacent baffle wall heating element 26 or 28, and the deflector shield 40 partially extends over the upper edge of wall 26 or 28. Thus, the full width of the upper openings to the cavities 22 & 23 which register beneath the toaster slots 24 & 25 is accessible to aid in placing bakery goods within the toaster cavities 22 & 23.

The toaster 10 according to the present invention also includes a carriage mechanism, generally designated by reference numeral 50 in FIG. 3, which is reciprocally movable between a "pop-up" or non-toasting position and a down or toasting position.

Carriage mechanism 50 is mounted upon a slide rod 52 mounted to the base frame 18 and extending substantially vertically upward therefrom. The slide rod 52 is located outside of the cavities 22 & 23, and for stability is fixed at its upper end to rod strut 54 which is in turn fixed to end wall 21. The slide rod 52 has a substantially constant diameter throughout its length, with the exception of a detent 56 formed at a position between the ends of the slide rod 52 to assist in locking the carriage mechanism 50 in the down, toasting position for a preselected period of time.

The carriage mechanism 50 includes a support frame 58 mounted, such as by a pair of upper and lower support legs 62 with appropriate holes therethrough to receive the slide rod 52, to permit sliding vertical movement of the entire carriage mechanism 50 along the slide rod 52. Secured to the support frame 58 and projecting through each cavity 22 & 23 is a bakery product support shelf 64. The support shelves 64 may be configured in a wide variety of forms. One economical form, as generally shown in the drawings, is a wire construction which may be bent in an extended zigzag shape through the product cavities 22 & 23 of the toaster 10 to provide a supporting surface of some width without limiting air circulation in the cavities 22 & 23. The support shelves 64 extend longitudinally in the cavities 22 & 23 through guide slots 66 located in each of the end walls 20 & 21. The guide slots 66 are vertically oriented and are sized slightly greater than that of the wire or rod preferably forming the support shelves 64, such that the guide slots 66 restrict unwanted lateral movement of the support shelves 64, yet allow them to move vertically up and down with the carriage mechanism 50.

Each support shelf 64 extends through each of the cavities 22 & 23 to receive a bakery product and support it in such a manner as to prevent the comestible from falling past the support shelf 64. As best illustrated with reference to FIGS. 1 & 2, the bakery product support shelves 64 are inclined or slightly tilted toward the stationary retainer 36 in each of the cavities 22 & 23. Constructed in this manner, the support shelf 64 contacts the lower edge of the bakery product which slides on the inclined surface of the shelf 64 to engagement with the adjacent stationary retainer 36.

Through the slot 66 in end wall 20 (i.e., the end wall opposite the end wall 21 which lies adjacent the carriage mechanism 50), an end projection 64a of the shelf 64 extends past the end wall 20. At the lowermost travel of the shelf 64, when the carriage mechanism is moved to the down or toasting position, the end projection 64a engages the level arm 38b of the movable retainer 38 to tilt or pivot the retainer 38 against the opposite biasing force provided by the spring member 42 as shown in FIG. 2.

Since the construction of the carriage mechanism 50 is known to those skilled in the toaster arts, many of the structural details are omitted herein for the purpose of clarity in the drawings. Generally, the intent and purpose of the carriage mechanism is to be releaseably locked against a spring force in the down or toasting position until a preselected time or temperature is reached afterwhich the carriage mechanism is released and moved upwardly by the spring force. An example of a carriage mechanism to be locked in a down or toasting position for a preselected time or temperature afterwhich the carriage mechanism is caused to "pop-up" or move from a down to an up position is illustrated in U.S. Pat. No. 5,385,082, issued Jan. 31, 1995, which is incorporated herein by reference.

For the purpose of understanding the present invention, therefore, it is sufficient that the carriage mechanism 50 connectively carry the bakery product support shelves 64 between the up and down positions within the cavities 22 & 23.

In operation, the toaster 10 will initially be in the condition as illustrated in FIG. 1. That is to say that the spring member 42 will urge the upper end of the movable retainer 38 away from the stationary retainer 36 and toward the baffle wall heating element 26 or 28. Accordingly, the full width of the upper openings to the cavities 22 & 23 which register beneath the toaster slots 24 & 25 is accessible to receive a bakery product having a thickness equal to or less than the width of the cavities 22 & 23 between the stationary retainer 36 and the movable retainer 38.

When a bakery product, such as a bread slice 70, is thinner than the full width of the toaster slot 25 and cavity 23, as illustrated in FIGS. 1 & 2, the lower edge of the bread slice 70 contacts the inclined support shelf 64 and slide over against the stationary retainer 36. The user can manually depress the lever grip 14 until the carriage mechanism 50 locks in the lowermost, toasting position as illustrated in FIG. 2. The end projection 64a of the support shelf 64 carrying the bread slice 70 engages the level arm 38b of the movable retainer 38 to tilt or pivot the retainer 38 against the opposite biasing force provided by the spring member 42. Such action causes the upper edge of the movable retainer 38 to contact the upper end of the bread slice 70 and urge it to engagement with the stationary retainer 36. Thus, the bread slice 70 is held in a vertical orientation and is uniformly spaced outwardly from the baffle wall heating element 27 a preselected distance as determined by the spacing of the retainer 36 from the heating element 27. It should also be noted that the inside surface of the bread slice 70 engaging the retainer 36 is substantially aligned with one side edge of the toaster slot 25.

With reference to the opposite side surface of the bread slice 70 (i.e., the side away from the heating element 27 and confronting heating element 28), the deflector shield 40 secured to the upper end of the movable retainer 38 substantially closes the toaster slot 25 between the side edge thereof and the bread slice itself. Accordingly, even though the toaster slot 25 is wider than the bread slice 70, the opening of the slot 25 is substantially closed by the lateral combination of the upper edge crust of the bread and the deflector shield 40 engaged therewith. In this manner, both surfaces of the bread slice 70 are uniformly spaced from an adjacent heating element 27 or 28. The deflector shield 40 closes any unnecessary opening of the toaster slot 25 as a result Of toasting a bakery product which has a lesser thickness than the full width opening of the toaster slot to thereby enhance toasting quality. Since the deflector shield 70 essentially blocks the escape of heat generated by the heating elements 27 & 28 during the toasting process, the shield 70 can become quite hot.

At the completion of the toasting cycle, the carriage mechanism 50 is released to pop upwardly under the influence of an associated spring (not shown) and to elevate the support shelf 64 and the now toasted bread slice 70 to the position as shown in FIG. 1. This action simultaneously releases the engagement of the lever arm 38b by the end projection 64a which permits the movable retainer 38 to pivot on its lower horizontal rod 36a in response to the force of spring member 42, moving the retainer 38 to the position as shown in FIG. 1. Accordingly, the heated deflector shield 70 is safely recessed beneath the toaster housing 12 to prevent contact by the user.

Of course, the toaster 10 of the invention can still be utilized in toasting bakery goods of a thickness which substantially conforms to the width of the toaster slots 24 & 25. As illustrated in FIG. 5, with a bakery product 72 such as a bagel or muffin, even though the width of cavity 23 is more or less filled, the product 72 is held upright and is uniformly spaced from the adjacent heating elements. The thickness of the product 72 prevents the movable retainer 38 from tilting inwardly as was previously described with reference to a thinner bread slice 70. Therefore, instead of causing the movable retainer 38 to tilt inwardly, the end projection 64a of the support shelf 64 simply deflects slightly upward in the slot 66 of the end wall accommodated by the cantilevered connection of the support shelf 64 with the carriage mechanism 50.

While the above invention has been described with regard to a particular embodiment, this should be apparent to those skilled in the art that various modifications are possible. For example, while the toaster 10 described included two slots for receiving bakery goods since this is a generally recognized configuration for toasters, toasters incorporating the invention may be appropriately configured to have either a single slot or a plurality of slots in excess of two.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A toaster comprising;

a base frame;

an exterior housing secured to said base frame;

a toaster slot disposed through said housing and having a width sufficient to receive the thickness of a bakery product to be toasted;

a pair of vertically oriented, planar heating elements mounted to said base frame and being spaced apart by a distance at least as great as the width of said toaster slot;

a bakery product support disposed horizontally between said planar heating elements and positioned beneath said toaster slot, said support positioned and arranged for reciprocal vertical movement between an upper nontoasting position wherein a bakery product received on said support partially extends from said housing through said toaster slot and a lower toasting position wherein a bakery product received on said support is contained within said housing between said heating elements;

an elongate deflector shield recessively mounted within said housing for limited movement relative to said toaster slot, said deflector shield having a recessed, safety position within said housing to permit unobstructed access through said toaster slot when said product support is moved to said upper nontoasting position, and said deflector shield being movable from said recessed, safety position to substantially block a portion of said toaster slot represented by the difference between the width of the toaster slot and the thickness of the bakery product received on said support; and electrical switch means secured to said base frame and connected to said heating elements for selectively energizing said heating elements when said product support is lowered to said toasting position.

2. The toaster as in claim 1 further including a stationary, planar product guide mounted to said base frame and spaced apart a uniform distance from one said heating element, said stationary product guide being vertically oriented to substantially register with one side of said toaster slot.

3. The toaster as in claim 2, wherein said bakery product support is inclined toward and forms a slightly acute angle with said stationary, planar product guide to cause the lower end of bakery product received on said support to slide to engagement with said stationary product guide.

4. The toaster as in claim 2 further including a movable product guide mounted to said base frame and adapted to hold bakery product received on said support in a substantially vertical orientation between said heating elements.

5. The toaster as in claim 4, said movable product guide mounted to said base frame and adapted to bias bakery product received on said support to engagement with said stationary, planar product guide.

6. The toaster as in claim 1 further including a carriage mechanism connected to said bottom frame for reciprocal vertical movement between an up, nontoasting position and a down, toasting position in which said carriage mechanism is releasably locked for a preselected period to cause said electrical switch means to energize said heating elements.

* * * * *